United States Patent
Kumar et al.

(10) Patent No.: US 12,010,082 B2
(45) Date of Patent: *Jun. 11, 2024

(54) SYSTEMS AND METHODS FOR AUTOMATICALLY IDENTIFYING SPAM IN SOCIAL MEDIA COMMENTS BASED ON CONTEXT

(71) Applicant: Rovi Guides, Inc., San Jose, CA (US)

(72) Inventors: Vijay Kumar, Karnataka (IN); Rajendran Pichaimurthy, Karnataka (IN); Madhusudhan Srinivasan, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/142,877

(22) Filed: May 3, 2023

(65) Prior Publication Data
US 2023/0275861 A1 Aug. 31, 2023

Related U.S. Application Data

(63) Continuation of application No. 16/541,788, filed on Aug. 15, 2019, now Pat. No. 11,677,703.

(51) Int. Cl.
*H04L 51/212* (2022.01)
*G06Q 50/00* (2012.01)
*H04L 51/52* (2022.01)

(52) U.S. Cl.
CPC .......... *H04L 51/212* (2022.05); *G06Q 50/01* (2013.01); *H04L 51/52* (2022.05)

(58) Field of Classification Search
CPC ........ H04L 51/212; H04L 51/52; G06Q 50/01
See application file for complete search history.

(56) References Cited

U.S. PATENT DOCUMENTS

| | | |
|---|---|---|
| 8,396,864 B1 | 3/2013 | Harinarayan et al. |
| 8,606,792 B1 | 12/2013 | Jackson et al. |
| 8,782,157 B1 | 7/2014 | Hansen |
| 8,955,127 B1 | 2/2015 | Sokolov et al. |
| 9,043,417 B1 | 5/2015 | Jones et al. |
| 9,146,943 B1 | 9/2015 | Thakur et al. |
| 9,401,947 B1 | 7/2016 | Oztaskent et al. |
| 9,830,360 B1 | 11/2017 | Mokani et al. |
| 10,162,900 B1 | 12/2018 | Chatterjee et al. |
| 10,198,427 B2 | 2/2019 | Yishay |
| 10,333,877 B2 | 6/2019 | Giura et al. |
| 10,616,353 B2 | 4/2020 | Shalita et al. |
| 10,742,435 B2 | 8/2020 | Vuskovic et al. |

(Continued)

*Primary Examiner* — Viet D Vu
(74) *Attorney, Agent, or Firm* — Haley Guiliano LLP

(57) ABSTRACT

Systems and methods are described herein for automatically identifying spam in social media comments based on comparison of the context or topic of the popular or trending post with the context or topic of each comment associated with the post. Content of a social media post is processed to identify a topic of the social media post. A plurality of comments associated with the social media post are accessed and the topic of each comment is compared to the topic of the social media post and, if the topics do not match, the comment is identified as spam. A notification is generated for display to an administrator of the social media platform on which the social media post resides identifying the comment as spam.

20 Claims, 12 Drawing Sheets

(56) References Cited

U.S. PATENT DOCUMENTS

| | | |
|---|---|---|
| 11,677,703 B2 | 6/2023 | Kumar et al. |
| 2011/0282952 A1 | 11/2011 | Song |
| 2012/0005199 A1 | 1/2012 | Acharya et al. |
| 2013/0024788 A1 | 1/2013 | Olsen et al. |
| 2013/0138735 A1 | 5/2013 | Kanter et al. |
| 2013/0191468 A1 | 7/2013 | Dichiu et al. |
| 2013/0218667 A1 | 8/2013 | Mohamed |
| 2013/0268536 A1 | 10/2013 | Nachiappan et al. |
| 2014/0230053 A1 | 8/2014 | Mote et al. |
| 2014/0324741 A1 | 10/2014 | Stewart et al. |
| 2015/0052138 A1 | 2/2015 | Sutton et al. |
| 2015/0317562 A1 | 11/2015 | Srinivasan et al. |
| 2015/0371341 A1 | 12/2015 | Iyer et al. |
| 2015/0378986 A1 | 12/2015 | Amin et al. |
| 2016/0028673 A1 | 1/2016 | Jeyaraman et al. |
| 2016/0042290 A1 | 2/2016 | Zhuang et al. |
| 2016/0142358 A1 | 5/2016 | Zunger et al. |
| 2016/0314113 A1 | 10/2016 | Moharrami et al. |
| 2016/0357870 A1 | 12/2016 | Hentschel et al. |
| 2017/0005962 A1 | 1/2017 | Lewin-Eytan et al. |
| 2017/0034107 A1 | 2/2017 | Krishnaswamy et al. |
| 2017/0142044 A1 | 5/2017 | Ball et al. |
| 2017/0220580 A1 | 8/2017 | Chi et al. |
| 2017/0337638 A1* | 11/2017 | Napper ............... G06Q 50/01 |
| 2018/0046475 A1 | 2/2018 | Wei et al. |
| 2018/0247189 A1 | 8/2018 | Adel et al. |
| 2018/0285413 A1 | 10/2018 | Vora et al. |
| 2018/0373703 A1 | 12/2018 | Blaschak et al. |
| 2019/0052722 A1 | 2/2019 | Gasking |
| 2019/0197399 A1* | 6/2019 | Zhang .................. G06N 5/022 |
| 2019/0347668 A1 | 11/2019 | Williams et al. |
| 2020/0050758 A1 | 2/2020 | Fullinwider et al. |
| 2020/0057946 A1 | 2/2020 | Singaraju et al. |
| 2020/0076759 A1* | 3/2020 | Kwatra ............... G06F 3/0482 |
| 2020/0142999 A1 | 5/2020 | Pedersen |
| 2020/0380074 A1 | 12/2020 | Li et al. |
| 2021/0051123 A1 | 2/2021 | Kumar et al. |
| 2021/0051124 A1 | 2/2021 | Kumar et al. |

\* cited by examiner

100

Channel 5 News /102

BREAKING NEWS: President Trump is the first U.S. President to set foot in North Korea 104a

Joanna Harris
I hope we can bring peace to the Korean peninsula after all these years!

104b

Brian Jameson
Wouldn't it be nice if we could make a deal with North Korea?

104c

John Smith
Call or email me for a free no-risk consultation!
(212) 555-0123 —— 106
trials@domain.com —— 108

110

Daily Entertainment /112

Re-release of Avengers: Endgame contains new post-credits scene. Check it out here!

114a

Simon Wharton
Avengers is the best! So sad that it's over! ☹

114b

Alexandra McArthur
Totally worth seeing the movie a second time!

114c

John Smith
Call or email now for a free no-risk consultation!
(212) 555-0123 —— 116
trials@domain.com —— 118

502 — Generate a first signature corresponding to the content of the $N^{th}$ comment and a second signature corresponding to the content of the comment associated with the other identified post

504 — Calculate a difference between the first signature and the second signature

506 — Is the difference between the first signature and the second signature below a difference threshold?
- No → End
- Yes ↓

508 — Identify a source of the $N^{th}$ comment associated with the $P^{th}$ post and the comment associated with the other identified post

510 — Is the source of the $N^{th}$ comment associated with the $P^{th}$ post the same the same as the source of the comment associated with the other identified post?
- No → End
- Yes ↓

512 — Determine that the content of the $N^{th}$ comment associated with the $P^{th}$ post is similar to the content of the second comment

FIG. 5

SYSTEMS AND METHODS FOR AUTOMATICALLY IDENTIFYING SPAM IN SOCIAL MEDIA COMMENTS BASED ON CONTEXT

CROSS-REFERENCE TO RELATED APPLICATION

This application is a continuation of U.S. patent application Ser. No. 16/541,788 now U.S. Pat. No. 11,677,703, filed Aug. 15, 2019, which is hereby incorporated by reference herein in its entirety.

BACKGROUND

The present disclosure relates to electronic messaging and, more particularly, detecting and identifying spam in messages such as comments posted on a social media network.

SUMMARY

Social media networks and other Internet-based platforms often allow users to publish comments to content, such as content posted by other users. The platforms generally do not limit the types of comments users can publish, as long as the content of the comments meets minimum guidelines established by each platform. As a result, many users take advantage of the popularity of certain content by publishing unrelated comments, known as spam, in response to such content. Currently, identification of spam comments often requires manual review of each comment, or of a subset of comments automatically identified by basic filtering algorithms. These methods generate many false positives, resulting in large numbers of comments requiring manual review by an administrator of each platform.

Systems and methods are described herein for automatically identifying spam in social media comments. The identification is based on a comparison of the content of a particular comment on a popular or trending post with content of other comments on the same or other popular or trending posts on the same or other social media platforms. Identification of a comment as spam may also be based on comparison of the context or topic of the popular or trending post with the context or topic of each comment associated with the post.

In embodiments where the identification of comments as spam is based on a comparison of the content of the comment with the content of other comments, at least one post in each of a number of trending topics is identified. Comments associated with each post are accessed and compared to determine whether content of a comment associated with one post is similar to, or matches, content associated with another post of a different trending topic. In response to determining that the content of a comment associated with one post is similar to the content of a comment associated with another post, the two comments are identified as spam, and a notification is generated for display to an administrator of the social media platform identifying the two comments as spam. In some cases, comments are compared across multiple social media platforms. If the content of a comment on one social media platform matches the content of a comment on another social media platform, a notification identifying one comment as spam is generated for display to an administrator of the corresponding social media platform while a second notification is generated for display to an administrator of the other social media platform identifying the other comment as spam.

To determine whether the content of one comment associated with a post is similar to the content of another comment associated with another post, signatures of each comment are generated that correspond to the content of each respective comment. A difference between the signatures is then calculated and compared to a threshold difference level. If the two comments are sufficiently different, i.e., the difference exceeds the threshold difference level, then the content of the comments is not similar. If, however, the difference is below the threshold difference level, then it is determined that the content of the two comments matches or is similar. Because spam is often posted by a single user, or from a single source (such as an IP address), the source of each comment may also be considered in determining whether the content of the comments is similar.

Alternatively, to determine whether the content of one comment associated with a post is similar to the content of another comment associated with another post, text of one comment is processed to determine whether the comment contains contact information, such as a phone number, email address, Skype® address, or other contact information. In response to determining that the text of the comment contains contact information, the other comment is similarly processed to determining whether it contains the same contact information. If so, the two comments are determined to be similar. If the other comment does not contain the contact information, then, in some embodiments, the contact information is compared to a plurality of advertisements. If the contact information appears in an advertisement, then the comment is identified as spam.

Since some types of content are likely to be repeated across multiple comments, an exclusion list may be maintained, which includes certain characters, strings, emojis, emoticons, or icons corresponding to the repeated content. If the content of two comments is determined to be similar, the content is compared to the exclusion list. If the content matches at least one entry of the exclusion list, the comments are identified as not being spam. If, however, the content does not match any entry of the exclusion list, the comments are identified as spam.

In embodiments where comparison of the context or topic of the popular or trending post with the context or topic of each comment associated with the post, content of a social media post is processed to identify a topic of the social media post. A plurality of comments associated with the social media post are accessed by, for example, querying a database of comments using an identifier of the social media post. The plurality of comments received in response to the query are then processed to identify the topic of each comment. The topic of each comment is compared to the topic of the social media post and, if the topics do not match, the comment is identified as spam. A notification is generated for display to an administrator of the social media platform on which the social media post resides identifying the comment as spam.

To process the content of the social media post, a textual portion of the social media post may be identified. Natural language processing, such as automatic summarization, is then used to analyze the textual portion of the social media post to identify the topic of the social media post. Similar processes may be used to process the content of each comment associated with the social media post to identify the topic of each comment.

Results of natural language processing may not always return the same topic for related texts. Thus, when determining whether the topic of a comment matches the topic of the social media post, synonymous topics are generated from the identified topic of the comment. The topic of the social media post is then compared with the synonymous topics. If the topic of the social media post matched any one of the synonymous topics, then it is determined that the topic of the comment and of the social media post match.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 1 shows an example of social media posts and associated comments containing detectable spam, in accordance with some embodiments of the disclosure;

FIG. 5 is a flowchart representing an illustrative process for determining whether the content of a first comment is similar to the content of a second comment, in accordance with some embodiments of the disclosure;

DETAILED DESCRIPTION

Figure 2:
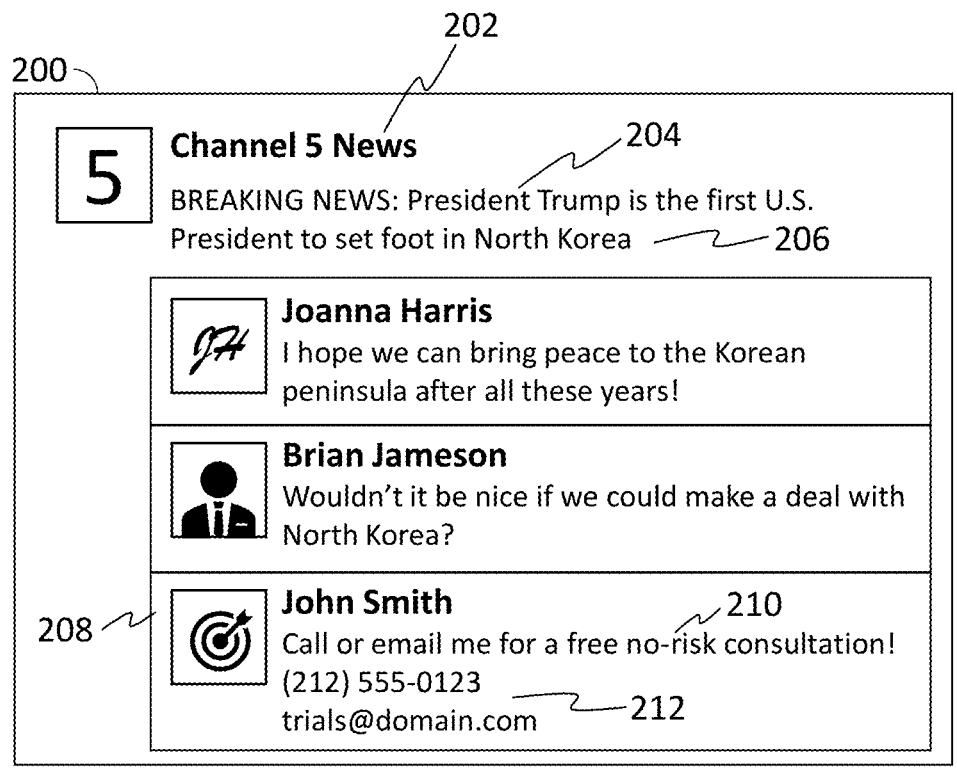
FIG. 2 shows another example of a social media post and associated comments containing detectable spam, in accordance with some embodiments of the disclosure.

FIG. 1 shows an example of social media posts and associated comments containing detectable spam, in accordance with some embodiments of the disclosure in which the identification of comments as spam is based on a comparison of the content of each comment. Trending topic 100 includes a first social media post 102 and comments 104a, 104b, and 104c. Trending topic 110 includes a second social media post 112 and comments 114a, 114b, and 114c. Comments 104a, 104b, and 104c are compared with comments 114a, 114b, and 114c and comments 104c and 114c are identified as containing the same or similar content. For example, the text of comment 104c is very similar to the text of comment 114c, differing in only one word. Additionally, both comments were published by the same user. Comment 104c contains contact information, such as phone number 106 and email address 108. Comment 114c contains contact information 116 and 118 matching contact information 106 and 108. Based on these similarities, and the fact that comment 104c and comment 114c are published in association with different trending topics (i.e., trending topics 100 and 110), comment 104c and comment 114c are identified as spam. In response to this identification, a notification such as an email, push notification, or other message is generated for display to an administrator of the social media platform on which the comments are published, indicating that comment 104c and comment 114c are spam. In some cases, social media post 102 and social media post 112 reside on different social media platforms, and a notification is generated for display to the administrator of each platform.

FIG. 2 shows another example of a social media post and associated comments containing detectable spam, in accordance with some embodiments of the disclosure in which identification of comments as spam is based on a comparison of the context or topic of each comment with the context or topic of the social media post in association with which the comment was published. Trending topic 200 includes social media post 202. The text of social media post 202 is analyzed using keywords and/or natural language processing to determine a topic of social media post 202. For example, references 204 and 206 in social media post 202 indicate that the topic of social media post 202 is North Korea. The topic of comment 208, however, is identified, based on text 210 and contact information 212, to be an advertisement. Thus, comment 208 is identified as spam and a notification is generated for display to an administrator of the social media platform indicating that comment 208 is spam.

Figure 3:
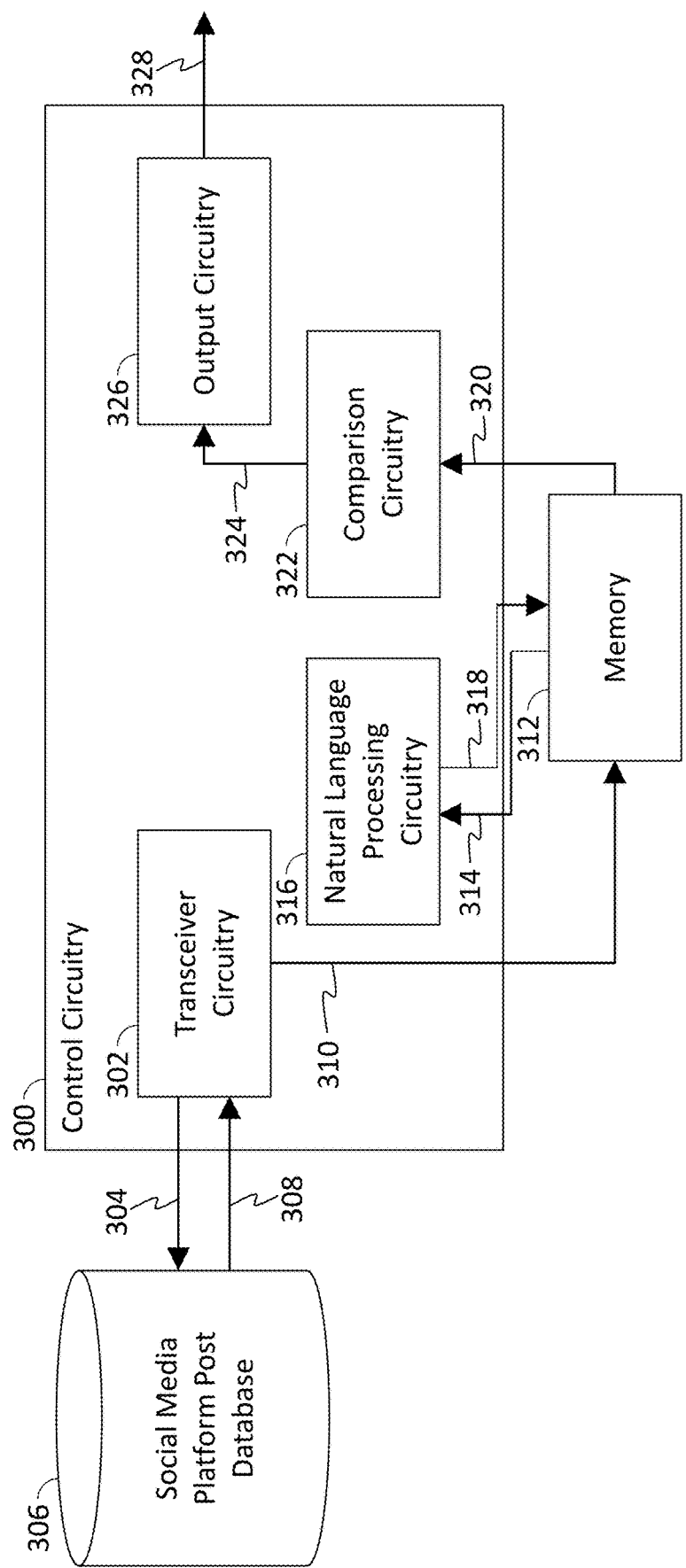
FIG. 3 is a block diagram of components and data flow therebetween of an exemplary system for identifying spam, in accordance with some embodiments of the disclosure.

FIG. 3 is a block diagram of components and data flow therebetween of an exemplary system for identifying spam, in accordance with some embodiments of the disclosure. Control circuitry 300 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Control circuitry 300 includes transceiver circuitry 302. Transceiver circuitry 302 may be a network connection such as an Ethernet port, WiFi module, or any other data connection suitable for communicating with a remote server. Transceiver circuitry 302 transmits a query 304 to social media platform post database 306 for social media posts and associated comments in trending topics. The query may be an SQL "SELECT" command, or any other suitable query format. Transceiver circuitry 302 receives, in response to query 304, social media posts and associated comments 308 from database 306. Transceiver circuitry 302 communicates 310 the social media posts and associated comments to memory 312. Memory 312 may be any device for temporarily storing electronic data, such as random-access memory, hard drives, solid state devices, quantum storage devices, or any other suitable fixed or removable storage devices, and/or any combination of the same.

Memory 312 transfers 314 a comment to natural language processing circuitry 316. Natural language processing circuitry 316 processes text portions of the comment. In embodiments in which spam is identified based on comparing content of different comments, natural language processing circuitry 316 may generate a signature of the comment and transfer 318 the signature to memory 312. After receiving signatures of at least two comments from natural language processing circuitry 316, memory 312 transfers 320 the signatures to comparison circuitry 322 to determine if two comments contain similar content. Alternatively, memory 312 can transfer the comments themselves to comparison circuitry 322, which determines through a simple comparison (e.g., a binary comparison) if the content of the comments is similar or identical. If comparison circuitry 322 determines that the content of the comments is similar or identical, then comparison circuitry 322 determines that the comments are spam and generates for display, to an administrator of the social media platform on which the comments reside, a notification indicating that the comments are spam. The notification is transferred 324 to output circuitry 326 for transmission 328 to the administrator. Output circuitry 326 may be a network connection such as an Ethernet port, WiFi module, or any other data connection suitable for transmitting the notification to the administrator. In some embodiments, transceiver circuitry 302 may be used to transmit the notification to the administrator.

In embodiments in which spam is identified based on comparing the topic or context of a comment with the topic or context of the social media post in association with which the comment was published, natural language processing circuitry 316 analyzes textual portions of the comment to identify the topic or context of the comment. Memory 312 also transfers the social media post to natural language processing circuitry 316 for similar processing. For example, natural language processing circuitry 316 may perform automatic summarization on the text of both the social media post and the comment to generate a respective topic of each. The topic of the post may be stored in memory 312 for transfer to comparison circuitry 322, along with the topic of each comment to be compared. Natural language processing circuitry 316 may also generate a list of synonymous topics for the topic of the comment against which comparison circuitry 322 compares the topic of the social media post. If comparison circuitry 322 determines that the topic of a comment does not match the topic of the social media post, comparison circuitry 322 identifies the comment as spam and, as above, generates for display, to an administrator of the social media platform, a notification indicating that the comment is spam.

Figure 4:
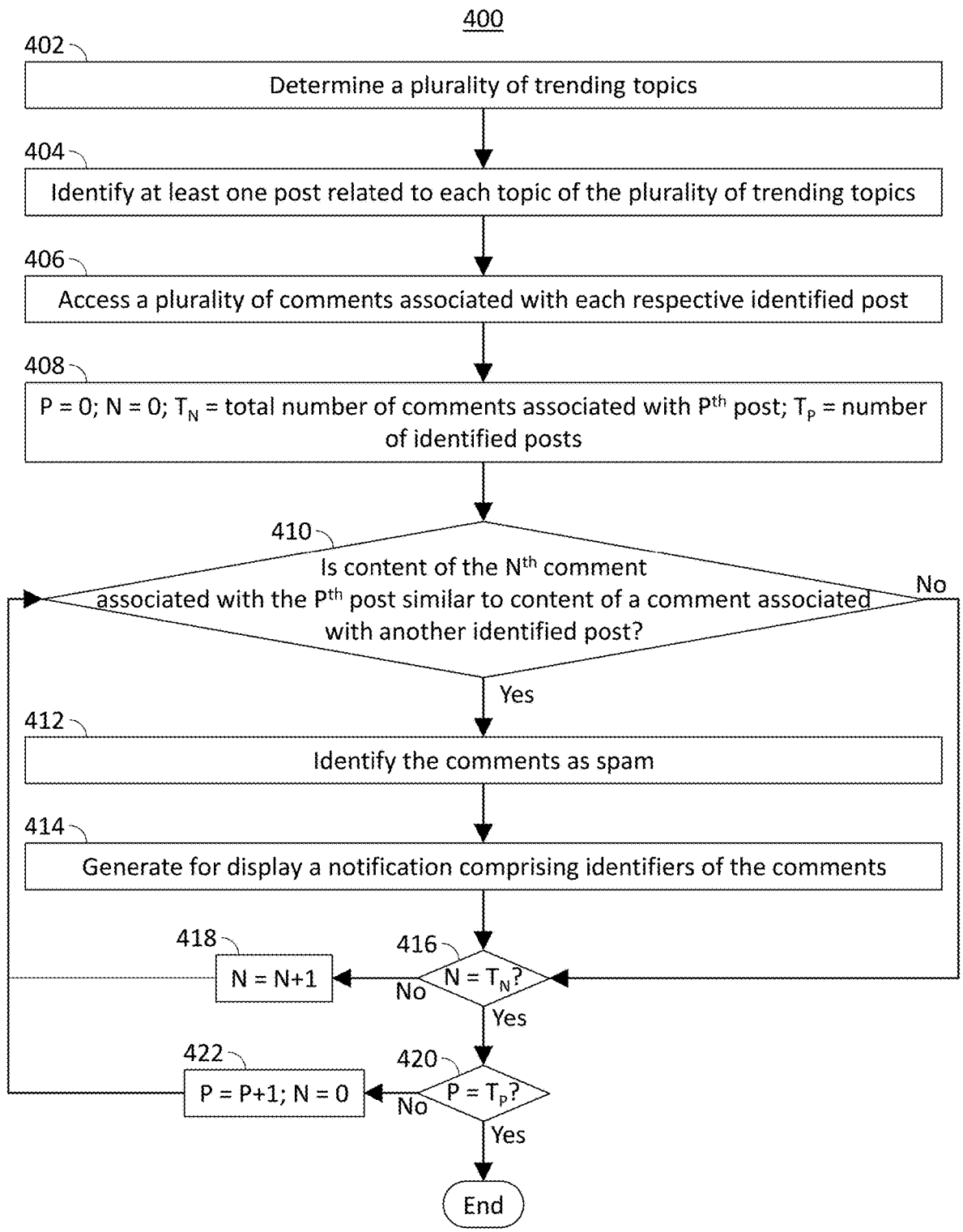
FIG. 4 is a flowchart representing an illustrative process for detecting spam on a social media platform, in accordance with some embodiments of the disclosure.

FIG. 4 is a flowchart representing an illustrative process 400 for detecting spam on a social media platform, in accordance with some embodiments of the disclosure. Process 400 may be implemented on control circuitry 300. In addition, one or more actions of process 400 may be incorporated into or combined with one or more actions of any other process or embodiment described herein.

At 402, control circuitry 300 determines a plurality of trending topics. For example, control circuitry 300, using transceiver circuitry 302, transmits a query to a database associated with a social media platform (e.g., database 306) for information related to currently trending topics. Alternatively, control circuitry 300, using transceiver circuitry 302, transmits a query to the database for a plurality of content items (i.e., social media posts) published in a particular window of time immediately preceding the current time (e.g., the last fifteen minutes) and, using results of the query, control circuitry 300 identifies trending topics directly from the plurality of content items.

At 404, control circuitry 300 identifies at least one post related to each topic of the plurality of trending topics. For example, control circuitry 300 receives, using transceiver circuitry 302, metadata describing the topic of each social media post. Control circuitry 300 then selects a social media post from each trending topic.

At 406, control circuitry 300 accesses a plurality of comments associated with each respective identified post. For example, each post may have a unique identifier, and comments published in association with that particular post may include the identifier in order to associate the comment with that post. For example, control circuitry 300, using transceiver circuitry 302, queries the database (e.g., database 306) for comments including the identifier of the identified post.

At 408, control circuitry 300 initializes several variables. These variables may be stored in memory 312. Control circuitry 300 initializes counter variable P representing the current post, and counter variable N representing the current comment associated with a particular post, and sets their values to zero. Control circuitry 300 also initializes variable $T_N$, setting its value to the total number of comments associated with the $P^{th}$ post, and variable $T_P$, setting its value to the total number of posts.

At 410, control circuitry 300 (using, e.g., comparison circuitry 322) determines whether the content of the $N^{th}$ comment associated with the $P^{th}$ post is similar to the content of a comment associated with another identified post. If so, then, at 412, control circuitry 300 identifies both the $N^{th}$ comment associated with the $P^{th}$ post and the comment associated with the other identified post, the content of which was determined to be similar, as spam. At 414, control circuitry 300 generates for display a notification comprising identifiers of the comments.

After generating the notification for display, or if the content of the $N^{th}$ comment associated with the $P^{th}$ post is not similar to any other comment associated with any other identified post, at 416, control circuitry 300 determines whether N is equal to the $T_N$. If not, then, at 418, control circuitry 300 increments the value of N by one, and processing returns to step 410. If N is equal to $T_N$, meaning that all comments associated with the $P^{th}$ post have been processed, then, at 420, control circuitry 300 determines whether P is equal to $T_P$. If not, then, at 422, control circuitry 300 increments the value of P by one, resets the value of N to zero, and processing returns again to step 410. If P is equal to $T_P$, meaning all the posts have been processed, then all comments from all identified posts have been compared, and the process is complete.

The actions or descriptions of FIG. 4 may be used with any other embodiment of this disclosure. In addition, the actions and descriptions described in relation to FIG. 4 may be done in suitable alternative orders or in parallel to further the purposes of this disclosure.

FIG. 5 is a flowchart representing an illustrative process 500 for determining whether the content of a first comment is similar to the content of a second comment, in accordance with some embodiments of the disclosure. Process 500 may be implemented on control circuitry 300. In addition, one or more actions of process 500 may be incorporated into or combined with one or more actions of any other process or embodiment described herein.

At 502, control circuitry 300, using natural language processing circuitry 316, generates a first signature corresponding to the content of a first comment and a second signature corresponding to the content of a second comment. A signature may include metadata describing the identified grammar, syntax, and word usage for a particular comment. For example, natural language processing circuitry 316 processes content of the first comment associated with an identified post and content of the second comment associated with another identified post and identifies grammar, syntax, and word usage in each comment.

At 504, control circuitry 300 calculates a difference between the first signature and the second signature. For example, control circuitry 300 may compare each component of the first signature with each corresponding component of the second signature to determine a percent difference in each component. An overall difference can be calculated by averaging the percent differences. Alternatively, each component may be weighted, and an overall difference calculated by applying a weighting value to each percent difference and averaging the weighted differences.

At 506, control circuitry 300 determines whether the difference between the first signature and the second signature is below a threshold difference level, such as five percent. If the difference is below the threshold different level, then, at 508, control circuitry 300 identifies a source on the first comment and a source of the second comment. For example, control circuitry 300 may identify a user account or IP address from which each comment was published. At 510, control circuitry 300 determines whether the source of the first comment is the same as the source of the second comment. If so, then, at 512, control circuitry 300 determines that the content of the first comment matches the content of the second comment.

The actions or descriptions of FIG. 5 may be used with any other embodiment of this disclosure. In addition, the actions and descriptions described in relation to FIG. 5 may be done in suitable alternative orders or in parallel to further the purposes of this disclosure.

Figure 6:
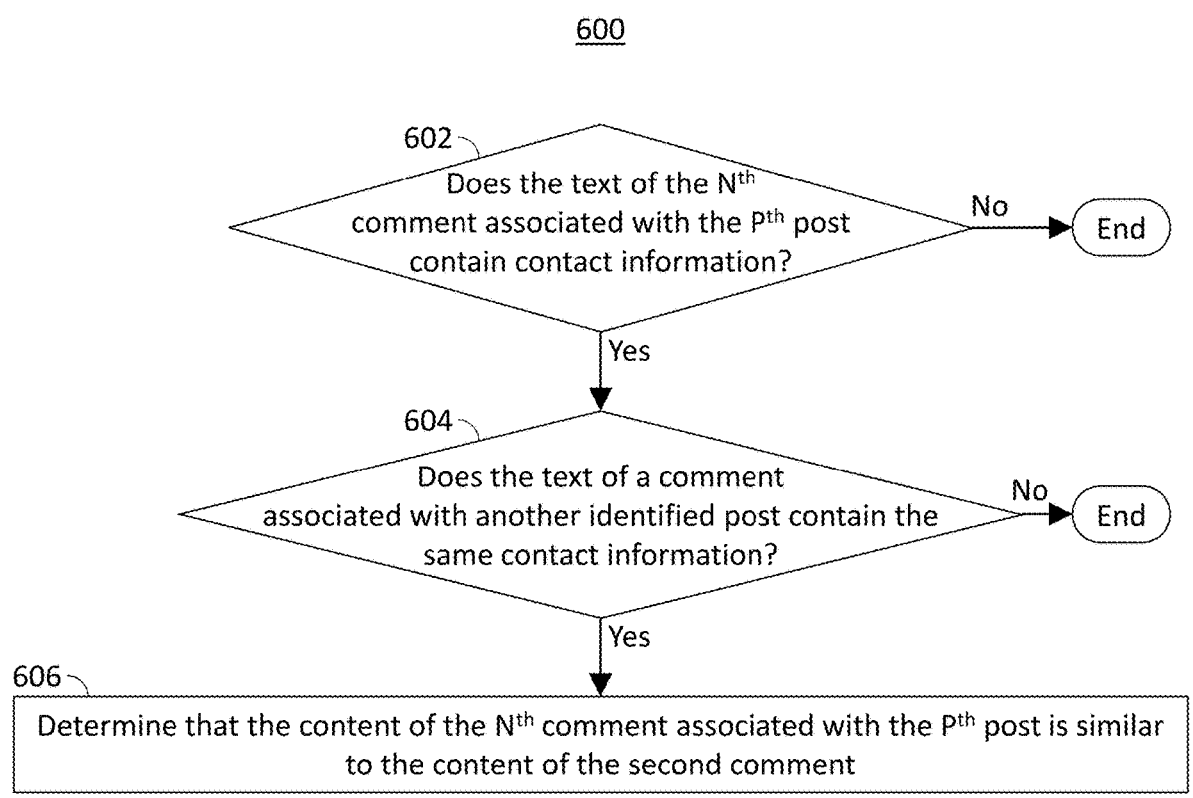
FIG. 6 is a flowchart representing a second illustrative process for determining whether the content of a first comment is similar to the content of a second comment, in accordance with some embodiments of the disclosure.

FIG. 6 is a flowchart representing a second illustrative process 600 for determining whether the content of a first comment is similar to the content of a second comment, in accordance with some embodiments of the disclosure. Process 600 may be implemented on control circuitry 300. In addition, one or more actions of process 600 may be incorporated into or combined with one or more actions of any other process or embodiment described herein.

At 602, control circuitry 300 determines whether the text of a first comment associated with an identified social media post contains contact information. For example, control circuitry 300, using natural language processing circuitry 316, processes text of the first comment to identify contact information such as a phone number, email address, or Skype® address in the text of the first comment. If the text of the first comment contains contact information, then, at 604, control circuitry 300, using natural language processing circuitry 316, determines whether the same contact information is also contained in the text of a second comment associated with another identified social media post. If so, then, at 606, control circuitry 300 determines that the content of the first comment is similar to the content of the second comment.

The actions or descriptions of FIG. 6 may be used with any other embodiment of this disclosure. In addition, the actions and descriptions described in relation to FIG. 6 may be done in suitable alternative orders or in parallel to further the purposes of this disclosure.

Figure 7:
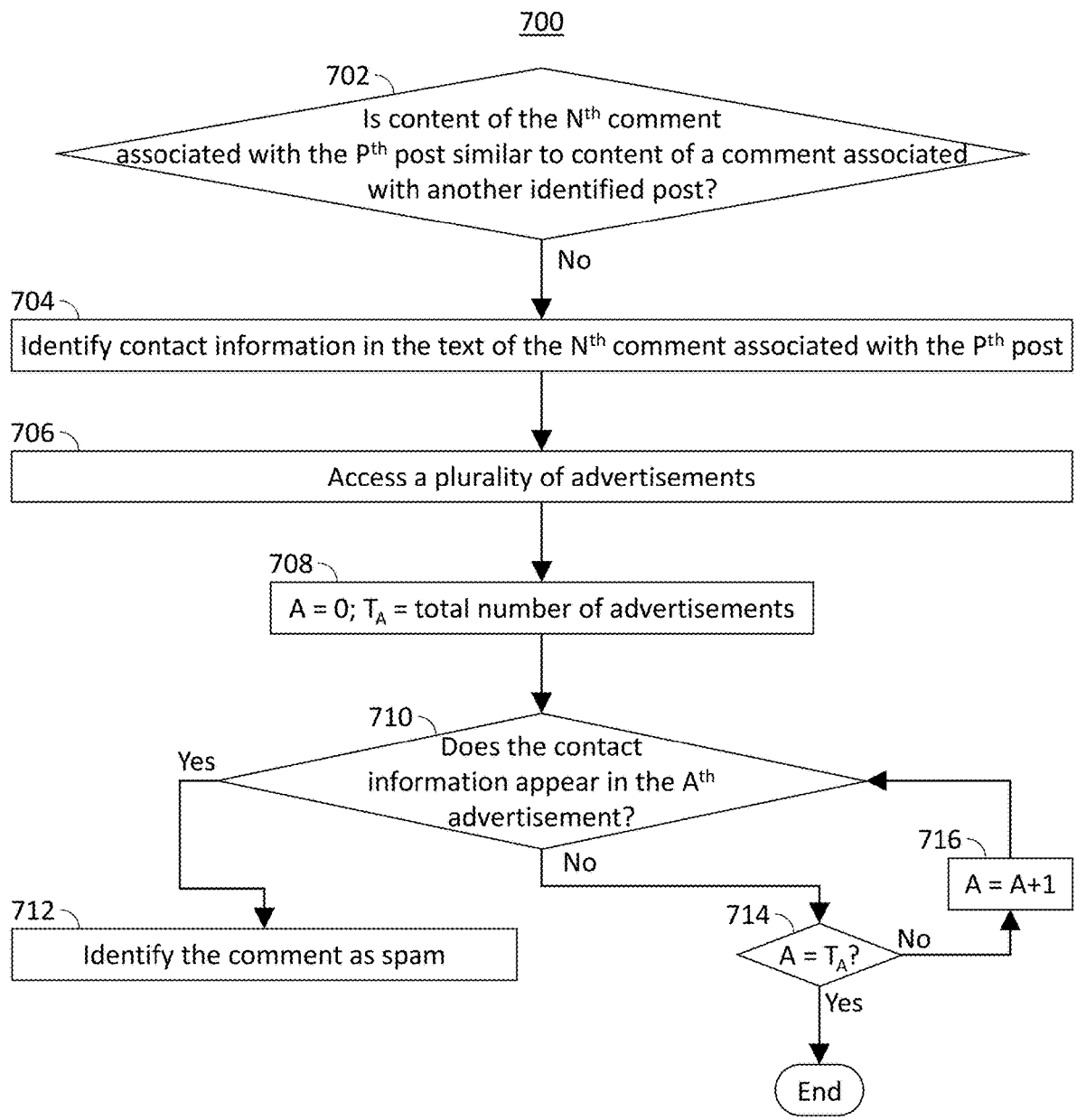
FIG. 7 is a flowchart representing an illustrative process for identifying as spam a comment that is not similar to other comments, in accordance with some embodiments of the disclosure.

FIG. 7 is a flowchart representing an illustrative process 700 for identifying as spam a comment that is not similar to other comments, in accordance with some embodiments of the disclosure. Process 700 may be implemented on control circuitry 300. In addition, one or more actions of process 700 may be incorporated into or combined with one or more actions in any other process or embodiment described herein.

At 702, control circuitry 300 determines whether content of a first comment associated with an identified social media post is similar to content of a second comment associated with another identified social media post, as described above in connection with FIG. 4. If control circuitry 300 determines that the content of the first comment is not similar to the content of the second comment, before identifying the comment as not being spam, at 704, control circuitry 300, using natural language processing circuitry 316, identifies contact information in the text of the first comment. This may be accomplished using methods described above in connection with FIG. 6.

At 706, control circuitry 300 accesses a plurality of advertisements. For example, a database of advertisements may be available. Control circuitry 300, using transceiver circuitry 302, may retrieve the plurality of advertisements from the database. At 708, control circuitry 300 initializes a counter variable A, setting its value to zero, and a variable $T_A$, representing the total number of advertisements, setting its value to the total number of advertisements retrieved from the advertisement database. At 710, control circuitry 300 determines whether the contact information identified in the first comment appears in the $A^{th}$ advertisement. If so, then, at 712, the first comment is identified as spam. If not, then, at 714, control circuitry 300 determines whether A is equal to $T_A$. If not, then, at 716, control circuitry 300 increments the value of A by one and processing returns to step 710. If A is equal to $T_A$, meaning that the contact information has been compared to all advertisements, then the process is complete.

The actions or descriptions of FIG. 7 may be used with any other embodiment of this disclosure. In addition, the actions and descriptions described in relation to FIG. 7 may be done in suitable alternative orders or in parallel to further the purposes of this disclosure.

Figure 8:
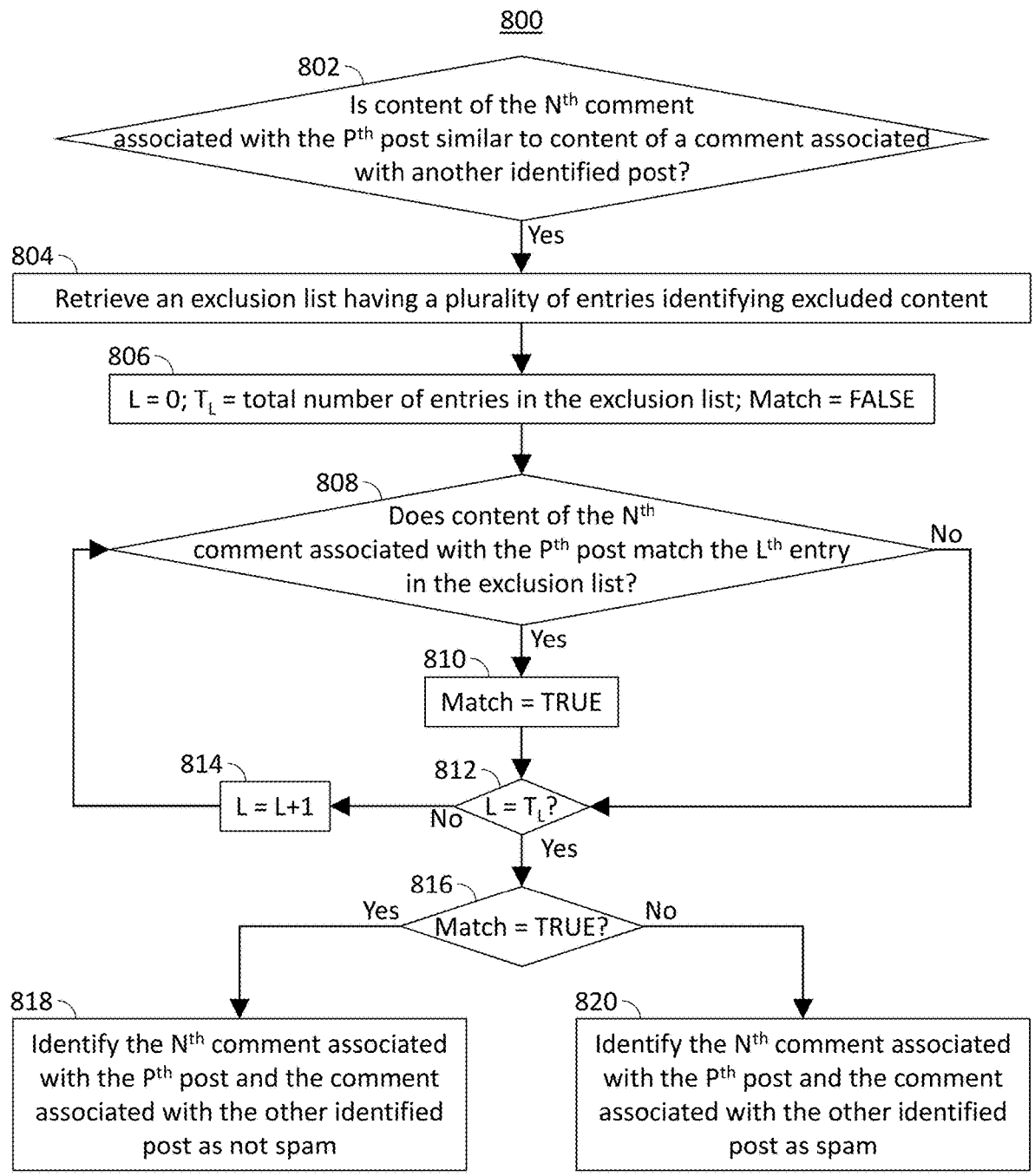
FIG. 8 is a flowchart representing an illustrative process for comparing the content of a comment to an exclusion list to confirm an identification of the comment as spam, in accordance with some embodiments of the disclosure.

Since some types of content are likely to be repeated across multiple comments, an exclusion list of acceptable content which should not be considered as indicative of spam may be maintained against which content of comments can be compared. FIG. 8 is a flowchart representing an illustrative process 800 for comparing the content of a comment to an exclusion list to confirm an identification of the comment as spam, in accordance with some embodiments of the disclosure. Process 800 may be implemented on control circuitry 300. In addition, one or more action of process 800 may be incorporated into or combined with one or more actions of any other process or embodiment described herein.

At 802, control circuitry 300, using natural language processing circuitry 316, determines whether the content of a first comment associated with an identified social media post is similar to the content of a second comment associated with another identified social media post, as described above in connection with FIG. 4. If the content of the first comment is determined to be similar to the content of the second comment, then, at 804, control circuitry 300 retrieves an exclusion list having a plurality of entries identifying excluded content, such as emojis, emoticons, and common text strings such as "LOL." The exclusion list may be stored in memory 312 or may be stored on a remote server and retrieved using transceiver circuitry 302.

At 806, control circuitry 300 initializes a counter variable L, setting its value to zero, a variable TL representing the total number of entries in the exclusion list, setting its value to the number of entries in the exclusion list, and a Boolean variable Match, setting its value to FALSE. At 808, control circuitry 300 determines whether the content of the first comment matches the $L^{th}$ entry in the exclusion list. If so, then, at 810, control circuitry 300 changes the value of the Match variable to TRUE. After setting this value, or if the content of the first comment does not match the $L^{th}$ entry in the exclusion list, at 812, control circuitry 300 determines whether L is equal to TL. If not, then, at 814, control circuitry 300 increments the value of L by one and processing returns to step 808.

If L is equal to TL, meaning that the content of the first comment has been compared with every entry in the exclusion list, then, at 816, control circuitry 300 determines whether the value of Match is TRUE. If the value of Match is TRUE, meaning that the content of the first comment matches at least one entry in the exclusion list, then, at 818, control circuitry 300 identifies the first comment as not being spam. If the value of Match is still FALSE after comparing the content of the first comment with every entry in the exclusion list, then, at 820, control circuitry 300 identifies the first comment as spam.

Alternatively, control circuitry 300 may, immediately after determining that content of the comment matches an entry in the exclusion list and setting the value of Match to TRUE at 810, proceed directly to step 818, determining that the $N^{th}$ comment is not spam.

The actions or descriptions of FIG. 8 may be used with any other embodiment of this disclosure. In addition, the actions and descriptions described in relation to FIG. 8 may be done in suitable alternative orders or in parallel to further the purposes of this disclosure.

Figure 9:
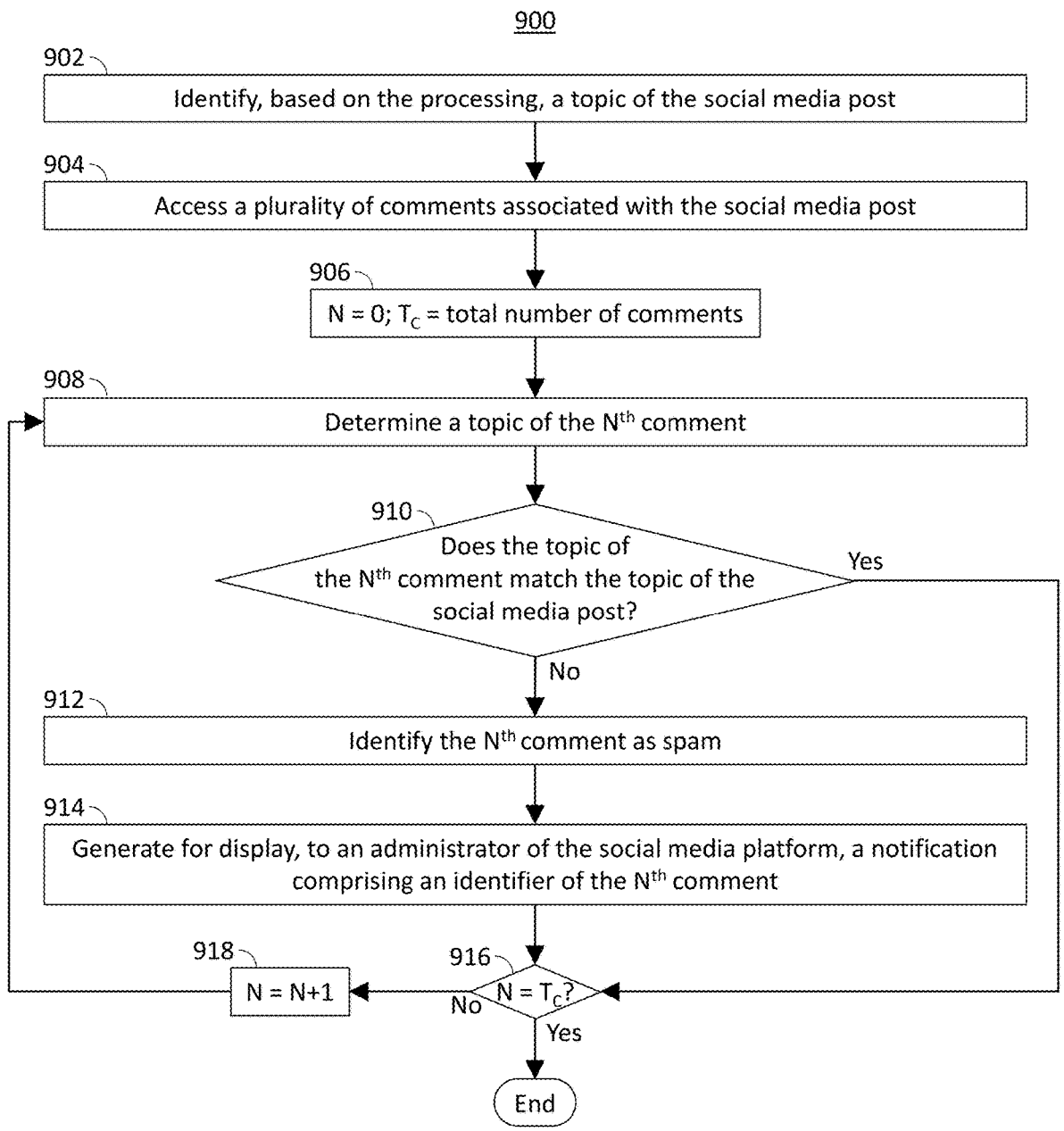
FIG. 9 is a flowchart representing a second illustrative process for detecting spam on a social media platform, in accordance with some embodiments of the disclosure.

FIG. 9 is a flowchart representing a second illustrative process 900 for detecting spam on a social media platform, in accordance with some embodiments of the disclosure. Process 900 may be implemented on control circuitry 300. In addition, one or more actions of process 900 may be incorporated into or combined with one or more actions of any other process or embodiment described herein.

At 902, control circuitry 300, using natural language processing circuitry 316, identifies a topic of the social media post. For example, natural language processing may employ automatic summarization to distill the content of the social media post down to as little as one word summarizing the topic of the social media post.

At 904, control circuitry 300, using transceiver circuitry 302, accesses a plurality of comments associated with the social media post. For example, control circuitry 300 may retrieve an identifier of the social media post and transmit a query to database 306 for comments associated with the retrieved identifier. At 906, control circuitry 300 initializes a counter variable N, setting its value to zero, and a variable $T_C$ representing the total number of comments associated with the social media post, setting its value to the total number of comments received in response to the query.

At 908, control circuitry 300, using natural language processing circuitry 316, determines a topic of the $N^{th}$ comment. This may be accomplished using methods described above in connection with identifying the topic of the social media post. At 910, control circuitry 300 determines whether the topic of the $N^{th}$ comment matches the topic of the social media post. For example, control circuitry 300 compares a string representing the topic of the $N^{th}$ comment with a string representing the topic of the social media post. If the topic of the $N^{th}$ comment does not match the topic of the social media post, then, at 912, control circuitry 300 identifies the $N^{th}$ comment as spam. In some embodiments, control circuitry 300 may confirm that the $N^{th}$ comment is spam by comparing the content of the $N^{th}$ comment to an exclusion list as described above in connection with FIG. 8. At 914, control circuitry 300 generates for display, to an administrator of the social media platform on which the $N^{th}$ comment resides, a notification indicating that the $N^{th}$ comment is spam.

After generating the notification, or if the topic of the $N^{th}$ comment matches the topic of the social media post, at 916, control circuitry 300 determines whether N is equal to $T_C$. If not, then, at 918, control circuitry 300 increments the value of N by one and processing returns to step 908. If N is equal to $T_C$, meaning that all comments associated with the social media post have been analyzed, then the process is complete.

The actions or descriptions of FIG. 9 may be used with any other embodiment of this disclosure. In addition, the actions and descriptions described in relation to FIG. 9 may be done in suitable alternative orders or in parallel to further the purposes of this disclosure.

Figure 10:
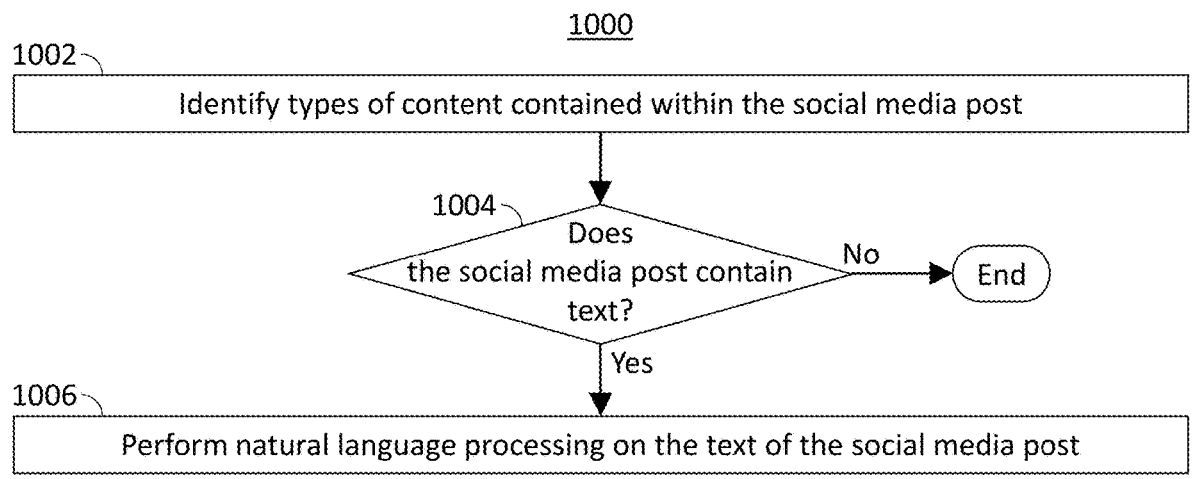
FIG. 10 is a flowchart representing an illustrative process for determining the topic of a social media post, in accordance with some embodiments of the disclosure.

FIG. 10 is a flowchart representing an illustrative process 1000 for determining the topic of a social media post, in accordance with some embodiments of the disclosure. Process 1000 may be implemented on control circuitry 300. In addition, one or more actions of process 1000 may be incorporated into or combined with one or more actions of any other process or embodiment described herein.

At 1002, control circuitry 300 identifies types of content within the social media post. For example, the social media post may contain text, images, videos, hyperlinks, or any other suitable type of content. Control circuitry 300 analyzes the social media post by, for example, identifying clear text or embedded file extensions, or by analyzing binary or hexadecimal data patterns to identify types of content contained within the social media post. At 1004, control circuitry 300 determines whether the social media post contains text and, if so, then, at 1006, control circuitry 300 performs natural language processing on the text of the social media post to determine the topic of the social media post by, for example, using automatic summarization.

The actions or descriptions of FIG. 10 may be used with any other embodiment of this disclosure. In addition, the actions and descriptions described in relation to FIG. 10 may be done in suitable alternative orders or in parallel to further the purposes of this disclosure.

Figure 11:
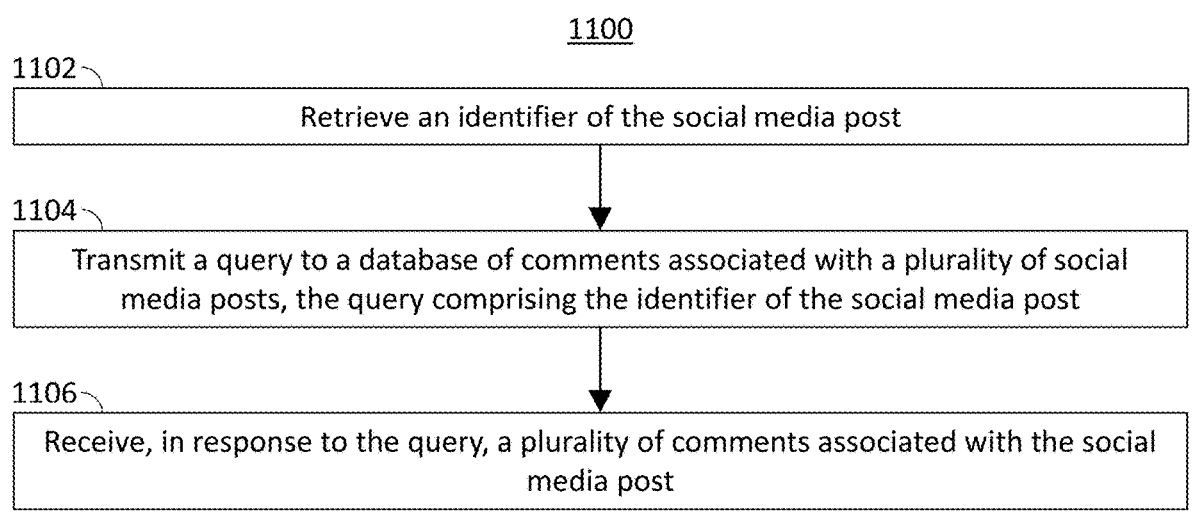
FIG. 11 is a flowchart representing an illustrative process for accessing a plurality of comments associated with a social media post, in accordance with some embodiments of the disclosure.

FIG. 11 is a flowchart representing an illustrative process 1100 for accessing a plurality of comments associated with a social media post, in accordance with some embodiments of the disclosure. Process 1100 may be implemented on control circuitry 300. In addition, one or more actions of process 1100 may be incorporated into or combined with one or more actions of any other process or embodiment described herein.

At 1102, control circuitry 300 retrieves an identifier of the social media post. For example, each social media post may be assigned a unique identification code, such as a 16-bit or 32-bit hexadecimal number. Control circuitry 300 may extract the identification code from metadata of the social media post. At 1104, control circuitry 300 transmits a query to a database of comments associated with a plurality of social media posts (e.g., database 306), the query comprising the identification code. At 1106, in response to the query, control circuitry 300 receives a plurality of comments associated with the social media post.

The actions or descriptions of FIG. 11 may be used with any other embodiment of this disclosure. In addition, the actions and descriptions described in relation to FIG. 11 may be done in suitable alternative orders or in parallel to further the purposes of this disclosure.

Figure 12:
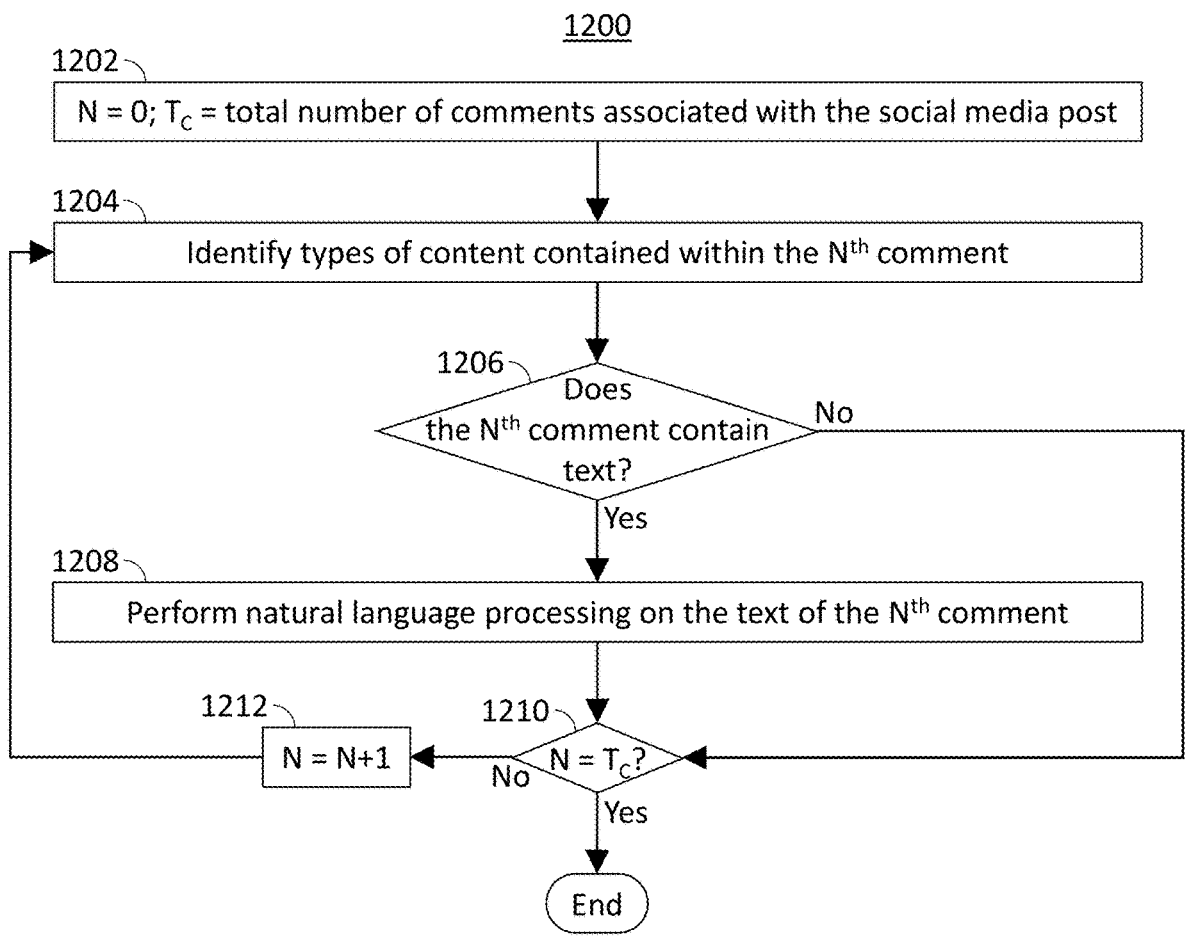
FIG. 12 is a flowchart representing an illustrative process for determining the topic of each of a plurality of comments, in accordance with some embodiments of the disclosure.

FIG. 12 is a flowchart representing an illustrative process 1200 for determining the topic of each of a plurality of comments, in accordance with some embodiments of the disclosure. Process 1200 may be implemented on control circuitry 300. In addition, one or more actions of process 1300 may be incorporated into or combined with one or more actions of any other process or embodiment described herein.

At 1202, control circuitry 300 initializes a counter variable N, setting its value to zero, and a variable $T_C$ representing the total number of comments associated with the social media post, setting its value to the total number of comments. At 1204, control circuitry 300 identifies types of content contained within the $N^{th}$ comment. At 1206, control circuitry 300 determines whether the $N^{th}$ comment contains text and, if so, then, at 1208, control circuitry 300 preforms natural language processing on the text of the $N^{th}$ comment. These actions can all be accomplished using methods described above in connection with FIG. 10.

After performing natural language processing on text of the $N^{th}$ comment, or if the $N^{th}$ comment does not contain any text, then, at 1210, control circuitry 300 determines whether N is equal to $T_C$. If not, then, at 1212, control circuitry 300 increments the value of N by one, and processing returns to step 1204. If N is equal to $T_C$, meaning that all comments associated with the social media post have been analyzed, then the process is complete.

The actions or descriptions of FIG. 12 may be used with any other embodiment of this disclosure. In addition, the actions and descriptions described in relation to FIG. 12 may be done in suitable alternative orders or in parallel to further the purposes of this disclosure.

Figure 13:
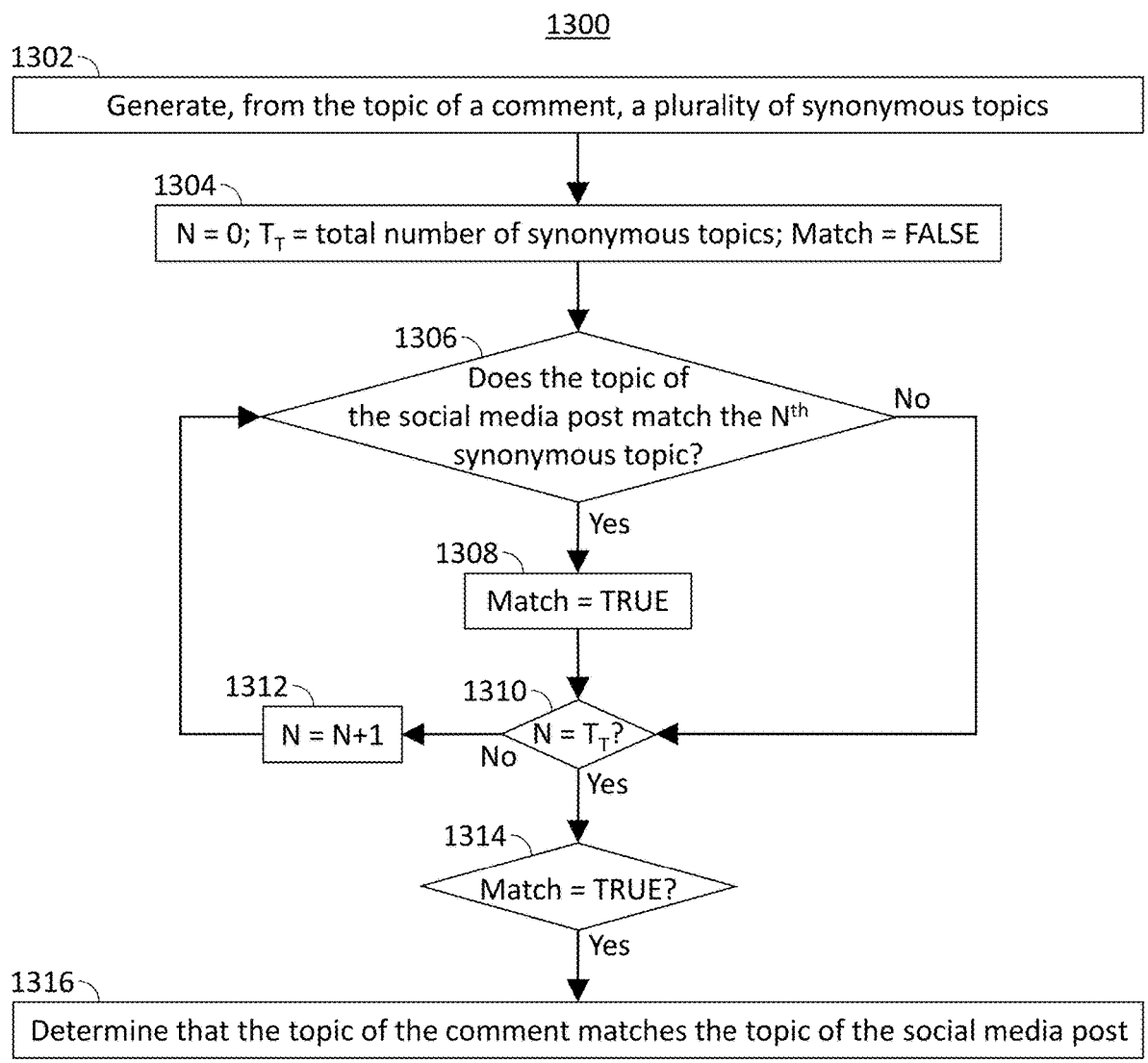
FIG. 13 is a flowchart representing an illustrative process for determining whether the topic of a comment matches the topic of the social media post with which it is associated, in accordance with some embodiments of the disclosure.

FIG. 13 is a flowchart representing an illustrative process 1300 for determining whether the topic of a comment matches the topic of the social media post with which it is associated, in accordance with some embodiments of the disclosure. Process 1300 may be implemented on control circuitry 300. In addition, one or more actions of process 1300 may be incorporated into or combined with one or more actions of any other process or embodiment disclosed herein.

At 1302, control circuitry 300 generates, from the topic of a comment, a plurality of synonymous topics. For example, control circuitry 300, using natural language processing circuitry 316, accesses a dictionary, thesaurus, or other word list and compiles a list of words having the same or similar meaning to the identified topic of the comment.

At 1304, control circuitry 300 initializes a counter variable N, setting its value to zero, a variable $T_T$ representing the total number of synonymous topics, setting its value to the total number of synonyms, and a Boolean variable Match, setting its value to FALSE. At 1306, control circuitry 300 determines whether the topic of the social media post matches the $N^{th}$ synonymous topic. If so, then, at 1308, control circuitry 300 sets the value of Match to TRUE.

After setting the value of Match to TRUE, or if the topic of the social media post does not match the $N^{th}$ synonymous topic, at 1310, control circuitry 300 determines whether N is equal to $T_T$. If not, then, at 1312, control circuitry 300 increments the value of N by one and processing returns to step 1306. If N is equal to $T_T$, meaning that the topic of the social media post has been compared to every synonymous topic, then, at 1314, control circuitry 300 determines whether the value of Match is TRUE. If so, then, at 1316, control circuitry 300 determines that the topic of the coment matches the topic of the social media post.

Alternatively, control circuitry 300 may, immediately after determining that topic of the post matches a synonymous topic and setting the value of Match to TRUE at 1308, proceed directly to step 1316, determining that the topic of the comment matches the topic of the social media post.

The actions or descriptions of FIG. 13 may be used with any other embodiment described herein. In addition, the actions and descriptions described in relation to FIG. 13 may be done in suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for detecting spam on a social media platform, the method comprising:
   identifying, by a server of the social media platform, a topic of a social media post;
   accessing, by the server, a comment associated with the social media post;
   determining, by the server, a topic of the comment;
   determining, by the server, based on the topic of the comment, a plurality of synonymous topics;
   determining, by the server, whether the topic of the comment matches the topic of the social media post based on the plurality of synonymous topics; and
   in response to determining, by the server, that the topic of the comment does not match the topic of the social media post:
   identifying, by the server, the comment as unrelated to the social media post; and transmitting, by the server to an administrator of the social media platform, a notification comprising an identifier of the comment.

2. The method of claim 1, further comprising:
identifying a textual portion of the social media post; and
performing natural language processing on the textual portion of the social media post.

3. The method of claim 2, wherein:
identifying a topic of the social media post comprises retrieving a result of the natural language processing; and
performing the natural language processing comprises automatically summarizing the textual portion of the social media post.

4. The method of claim 1, wherein accessing the comment associated with the social media post comprises:
retrieving an identifier of the social media post;
transmitting a query to a database of comments associated with a plurality of social media posts, the query comprising the identifier of the social media post; and
receiving, in response to the query, at least the comment associated with the social media post.

5. The method of claim 1, wherein determining a topic of the comment comprises:
identifying a textual portion of the comment; and
performing natural language processing on the textual portion of the comment;
wherein performing the natural language processing comprises automatically summarizing the textual portion of the comment.

6. The method of claim 1, wherein:
determining, based on the topic of the comment, the plurality of synonymous topics comprises generating, from the topic of the comment, the plurality of synonymous topics; and
determining whether the topic of the comment matches the topic of the social media post comprises:
comparing the topic of the social media post with the plurality of synonymous topics; and
determining, based on the comparing, that the topic of the social media post matches at least one of the plurality of synonymous topics.

7. The method of claim 1, further comprising, in response to determining that the topic of the comment does not match the topic of the social media post:
comparing content of the comment to a plurality of entries of an exclusion list identifying excluded content;
determining, based on the comparing, whether the content of the comment matches at least one entry of the plurality of entries; and
in response to determining that the content of the comment matches at least one entry of the plurality of entries, identifying the comment as related to the social media post;
wherein identifying the comment as unrelated to the social media post is in response to determining that the content of the comment does not match any entry of the plurality of entries.

8. The method of claim 7, wherein the plurality of entries identifying excluded content comprises characters representing emotional responses.

9. The method of claim 8, wherein the characters representing emotional responses comprise at least one of alphanumeric characters or graphical icons.

10. The method of claim 1, wherein the notification indicates that the comment is spam.

11. A system for detecting spam on a social media platform, the system comprising:
control circuitry implemented on a server of the social media platform and configured to:
identify a topic of a social media post;
access, a comment associated with the social media post;
determine a topic of the comment;
determine, based on the topic of the comment, a plurality of synonymous topics;
determine whether the topic of the comment matches the topic of the social media post based on the plurality of synonymous topics; and
in response to determining that the topic of the comment does not match the topic of the social media post:
identify the comment as unrelated to the social media post; and
transceiver circuitry configured to:
transmit, to an administrator of the social media platform, a notification comprising an identifier of the comment.

12. The system of claim 11, wherein the control circuitry is further configured to:
identify a textual portion of the social media post; and
perform natural language processing on the textual portion of the social media post.

13. The system of claim 12, wherein:
the control circuitry is configured to identify a topic of the social media post by retrieving a result of the natural language processing; and
the control circuitry is configured to perform the natural language processing by automatically summarizing the textual portion of the social media post.

14. The system of claim 11, wherein the control circuitry, when accessing the comment associated with the social media post, is configured to:
retrieve an identifier of the social media post;
transmit a query to a database of comments associated with a plurality of social media posts, the query comprising the identifier of the social media post; and
receive, in response to the query, at least the comment associated with the social media post.

15. The system of claim 11, wherein the control circuitry, when determining a topic of the comment, is configured to:
identify a textual portion of the comment; and
perform natural language processing on the textual portion of the comment, wherein the control circuitry is configured to automatically summarize the textual portion of the comment.

16. The system of claim 11, wherein:
the control circuitry is configured to determine, based on the topic of the comment, the plurality of synonymous topics by generating, from the topic of the comment, the plurality of synonymous topics; and
the control circuitry is configured to determine whether the topic of the comment matches the topic of the social media post by:
comparing the topic of the social media post with the plurality of synonymous topics; and
determining, based on the comparing, that the topic of the social media post matches at least one of the plurality of synonymous topics.

17. The system of claim 11, wherein the control circuitry is further configured to, in response to determining that the topic of the comment does not match the topic of the social media post:

compare content of the comment to a plurality of entries of an exclusion list identifying excluded content;

determine, based on the comparing, whether the content of the comment matches at least one entry of the plurality of entries; and in response to determining that the content of the comment matches at least one entry of the plurality of entries, identify the comment as related to the social media post;

wherein the control circuitry is configured to identify the comment as unrelated to the social media post in response to determining that the content of the comment does not match any entry of the plurality of entries.

18. The system of claim 17, wherein the plurality of entries identifying excluded content comprises characters representing emotional responses.

19. The system of claim 18, wherein the characters representing emotional responses comprises at least one of alphanumeric characters or graphical icons.

20. The system of claim 11, wherein the notification indicates that the comment is spam.

* * * * *